Patented Apr. 2, 1946

2,397,724

UNITED STATES PATENT OFFICE 2,397,724

COPOLYMERS OF VINYL CHLORIDE AND TRICHLORETHYLENE

Oliver W. Cass, Niagara Falls, N. Y., assignor to E. I. du Pont de Nemours & Company, Wilmington, Del., a corporation of Delaware No Drawing. Application May 24, 1943,
Serial No. 488,213

4 Claims. (Cl. 260—86)

This invention relates to new and improved resinous materials which possess high resistance to the action of acids, bases, and other corrosive materials. More particularly, it relates to the preparation of new and improved resinous materials by copolymerizing vinyl chloride and trichlorethylene which resins, in spite of their high resistivity, possess the flexibility when deposited upon a surface material essential to permit their utilization as coating materials.

Films which comprise essentially polyvinyl chloride, prepared by the polymerization of vinyl chloride, are highly resistant to the action of acids, bases, and the usual solvents but possess certain disadvantages in that this polymeric material is extremely insoluble in the cheaper solvents ordinarily utilized in applying resinous films such as the lower aliphatic ketones and the aromatic hydrocarbons. While finishes prepared with polymerized vinyl chloride as the base possess certain outstanding commercial advantages, ordinarily the difficulty of applying them in the form of a solution dissolved in the more inexpensive solvents has prevented their more extensive use. In order to secure a polymerized vinyl chloride resin (polyvinyl chloride) having satisfactory solubility characteristics in solvents such as the lower aliphatic ketones and aromatic hydrocarbons it is essential to select polymers of relatively low molecular weight which polymers are less desirable in that they give brittle films of limited usefulness.

It is one of the objects of this invention to prepare resinous materials from vinyl chloride which resins possess greater solubility in the usually employed solvents to the end that these resins may be applied as coating materials in the usual way without undue difficulty or the disadvantages inherent in the necessity for utilizing special methods to bring the polymeric material into solution. It is another object of this invention to secure highly soluble copolymers of vinyl chloride and trichlorethylene which resinous copolymers exhibit all of the desirable properties of polyvinyl chloride insofar as resistance to acids, bases and other corrosive agents is concerned, which resinous copolymers, nevertheless, possess sufficient flexibility when deposited upon a surface to render them of outstanding usefulness as coating materials. These and still further objects of this invention will be apparent from the ensuing disclosure of certain preferred embodiments thereof.

While vinyl esters have previously been polymerized in the presence of halogenated solvents which possess solvent properties for the polymerized vinyl ester, this has not involved any copolymerization or interpolymerization of the two materials. Where vinyl esters have been polymerized in the presence of an aliphatic halogenated hydrocarbon such as trichlorethylene the relative proportions of trichlorethylene to vinyl ester have been much greater than those characteristic of my method wherein the vinyl chloride and trichlorethylene are actually interpolymerized. Under previous conditions where large amounts of the halogenated hydrocarbon were present with the vinyl ester the vinyl ester polymerized with itself, the aliphatic halogenated hydrocarbon acting as a solvent for the polymeric product, so that there was obtained a solution of this polymeric product in the halogenated hydrocarbon. Where the ratio of trichlorethylene to vinyl chloride present in the mixture subjected to polymerizing influences is definitely limited, in accordance with my improved procedure, the trichlorethylene does not behave merely as solvent for the product resulting from the polymerization of the vinyl chloride but actually copolymerizes or interpolymerizes with the latter to secure a novel product which is neither polymerized vinyl chloride nor polymerized trichlorethylene. As previously stated this new resinous polymeric material possesses properties much different from the usual polymerized vinyl chloride, properties which render it satisfactory for utilization for a number of purposes for which ordinary polyvinyl chloride is not suitable.

In order to secure the improved resinous materials I have found that the amount of trichlorethylene present should be restricted so that it ranges from approximately 1% to 5% by weight based on the weight of the monomeric mixture subjected to copolymerization. Resins of most satisfactory character are secured when the amount of trichlorethylene copolymerized with the vinyl chloride ranges from 1.5% to 3% by weight based on the total weight of the polymer. Under these circumstances there is secured a highly soluble resinous copolymeric material exhibiting all of the desirable properties of polymerized vinyl chloride insofar as resistance to acids, bases, and other corrosive agents is concerned, yet which readily dissolves in the usual less expensive solvents and which yields films of satisfactory flexibility and high resistance to chemical agents and abrasion.

In carrying out the copolymerization no special precautions are necessary. The mixture of vinyl chloride monomer and trichlorethylene is prepared, charged into an autoclave, and any suitable polymerization catalyst added. The mixture is then heated slightly to initiate the reaction which is exothermic in character and should preferably be controlled to avoid the development of excessive pressures within the autoclave. Temperatures in the neighborhood of 40 to 60° C. are generally suitable. After 3 or 4 hours the reaction is substantially complete and the polymer may be recovered from the contents of the autoclave by precipitation and filtration in the usual way.

While any suitable polymerization catalyst may be used, generally I prefer to use a persulfate-bisulfite catalyst such as one comprising ammonium persulfate and sodium bisulfite.

The following examples are illustrative of my invention:

Example 1

An autoclave capable of withstanding pressures of 100 to 150 lbs. per square inch was charged with a mixture comprising 4500 parts of water; 1477.5 parts of vinyl chloride monomer; 22.5 parts of trichlorethylene; and, as polymerization catalyst, a mixture comprising 7.5 parts of ammonium persulfate and 7.5 parts of sodium bisulfite. The contents of the autoclave were heated, with stirring, to 40° C. whereupon an exothermic reaction set in which was regulated by suitable cooling means so that the maximum temperature reached by the contents of the reaction vessel was approximately 50° C.

After three hours the pressure within the autoclave had dropped approximately 50 lbs. per square inch from the peak pressure reached during the reaction period. The contents of the autoclave were discharged and the polymer precipitated, filtered off, and dried in the usual way. There was secured 1258 parts of dry, finely divided copolymer. This copolymer was soluble to the extent of 20 to 25% by weight in a solvent mixture comprising 60% by weight of methyl ethyl ketone and 40% by weight of toluene. When this solution was permitted to flow onto a steel sheet and allowed to dry until all solvent had been evaporated, the resulting coating upon the steel sheet was highly satisfactory as regards adhesion, flexibility, and resistivity to the action of acids and alkalies.

Example 2

A copolymeric material was prepared by following the process described in Example 1 utilizing however in the polymerization a mixture of vinyl chloride monomer and trichlorethylene wherein the trichlorethylene constituent amounted to 3% by weight. The time required for completion of the polymerization was four hours and twenty minutes. The resulting dry powder was soluble to the extent of 30% at 25° C. in a solvent mixture comprising 60% methyl ethyl ketone and 40% toluene. Coatings applied to steel panels from this solution were flexible, adherent, and highly resistant to the action of acids and alkalies.

Example 3

A copolymerization was carried out following the procedure described in Example 1 except that the amount of trichlorethylene incorporated in the monomeric mixture was 5% by weight. The peak temperature reached during the reaction was 45.5° C., which temperature was reached approximately thirty-three minutes after heating of the charge was begun. Yield of dry copolymer was 88.3%, this material having a chlorine content, by analysis, of approximately 57.5% by weight. The copolymer was soluble to the extent of 25 to 30% in a solvent mixture comprising 60% acetone and 40% toluene. Films deposited from solutions of this copolymer were tough, flexible, somewhat elastic in character, and were in all respects well suitable for use as lacquers.

The products obtained in accordance with this invention are useful for many purposes in the lacquer industry and may generally be employed for impregnating and insulating purposes. They may be employed alone or in combination with other resinous products.

As various changes may be made in the preferred procedure as described without departing from the scope of my invention, it is intended that its scope shall be construed in accordance with the appended claims.

I claim:

1. The process for preparing resinous materials which comprises copolymerizing a monomeric mixture of vinyl chloride and trichlorethylene in which the ratio of vinyl chloride to trichlorethylene is between 99:1 and 95:5.

2. The process for preparing resinous materials which comprises copolymerizing a monomeric mixture of vinyl chloride and trichlorethylene in which the ratio of vinyl chloride to trichlorethylene is between 98.5:1.5 and 97:3.

3. A resinous copolymer of vinyl chloride and trichlorethylene obtained by the copolymerization of a monomeric mixture of vinyl chloride and trichlorethylene in which the ratio of vinyl chloride to trichlorethylene is between 99:1 and 95:5.

4. A resinous copolymer of vinyl chloride and trichloroethylene obtained by the copolymerization of a monomeric mixture of vinyl chloride and trichlorethylene in which the ratio of vinyl chloride to trichlorethylene is between 98.5:1.5 and 97:3.

OLIVER W. CASS.